US006183623B1

(12) United States Patent
Cisar et al.

(10) Patent No.: US 6,183,623 B1
(45) Date of Patent: *Feb. 6, 2001

(54) ELECTROCHEMICAL CONVERSION OF ANHYDROUS HYDROGEN HALIDE TO HALOGEN GAS USING AN IONICALLY CONDUCTING MEMBRANE

(75) Inventors: Alan J. Cisar, Cypress, TX (US); Anuncia Gonzalez-Martin, San Jose, CA (US); G. Duncan Hitchens; Oliver J. Murphy, both of Bryan, TX (US)

(73) Assignee: Lynntech, Inc., College Station, TX (US)

( * ) Notice: Under 35 U.S.C. 154(b), the term of this patent shall be extended for 0 days.

This patent is subject to a terminal disclaimer.

(21) Appl. No.: 09/034,527

(22) Filed: Mar. 3, 1998

Related U.S. Application Data

(63) Continuation-in-part of application No. 08/806,785, filed on Feb. 26, 1997, now Pat. No. 5,916,505, which is a continuation of application No. 08/344,813, filed on Nov. 23, 1994, now Pat. No. 5,635,039, which is a continuation-in-part of application No. 08/091,752, filed on Jul. 13, 1993, now Pat. No. 5,460,705.

(51) Int. Cl.$^7$ ....................................................... C25B 1/24

(52) U.S. Cl. .................. 205/618; 205/622; 204/252; 204/282; 204/290 R; 204/296; 423/481; 423/483

(58) Field of Search ................................. 205/621, 622, 205/618; 204/252, 282, 290 R, 296; 423/481, 483

(56) References Cited

U.S. PATENT DOCUMENTS

| | | | |
|---|---|---|---|
| 4,615,775 | 10/1986 | de Nora | 204/128 |
| 4,803,065 | 2/1989 | Itoh et al. | 423/502 |
| 4,822,589 | 4/1989 | Kiyoura et al. | 423/502 |
| 5,154,911 | 10/1992 | Benson et al. | 423/502 |
| 5,411,641 | 5/1995 | Trainham, III et al. | 204/59 R |
| 5,460,705 | * 10/1995 | Murphy et al. | 204/252 |
| 5,580,437 | 12/1996 | Trainham, III et al. | 205/621 |
| 5,635,039 | 6/1997 | Cisar et al. | 204/252 |

OTHER PUBLICATIONS

Douglas J. Eames and John Newman, "Electrochemical Conversion of Anhydrous HCl to Cl$_2$ Using a Solid–Polymer–Electrolyte Electrolysis Cell", Nov. 11, 1995, pp. 3619–3625.

Pallav Tatapudi, Robert D. Villwock, Thomas E. Springer, Mahlon S. Wilson, and Shimshon Gottesfeld, "Electrochemical Conversion of Anhydrous Hydrogen Chloride to Chlorine in a Proton Exchange Membrane Reactor", pp. 142–151 (No Date Available).

\* cited by examiner

Primary Examiner—Kishor Mayekar
(74) Attorney, Agent, or Firm—Streets & Steele; Jeffrey L. Streets

(57) ABSTRACT

The invention relates to a process for electrochemically converting anhydrous hydrogen halide, such as hydrogen chloride, hydrogen fluoride, hydrogen bromide and hydrogen iodide, to essentially dry halogen gas, such as chlorine, fluorine, bromine and iodine gas, respectively. In a preferred embodiment, the present invention relates to a process for electrochemically converting anhydrous hydrogen chloride to essentially dry chlorine gas. This process allows the production of high-purity chlorine gas. In this process, molecules of essentially anhydrous hydrogen chloride are transported through an inlet of an electrochemical cell. The molecules of the essentially anhydrous hydrogen chloride are oxidized at the anode of the cell to produce essentially dry chlorine gas and protons, which are transported through the membrane of the cell. The transported protons are reduced at the cathode to form either hydrogen gas, water or hydrogen peroxide.

36 Claims, 7 Drawing Sheets

ELECTROCHEMICAL CONVERSION OF ANHYDROUS HYDROGEN HALIDE TO HALOGEN GAS USING AN IONICALLY CONDUCTING MEMBRANE

This application is a continuation-in-part of U.S. patent application Ser. No. 08/806,785 filed Feb. 26, 1997, now U.S. Pat. No. 5,916,505; which application is a continuation of U.S. patent application Ser. No. 08/344,813 filed on Nov. 23, 1994, now U.S. Pat. No. 5,635,039; which is a continuation-in-part of U.S. patent application Ser. No. 08/091,752 filed Jul. 13, 1993, now U.S. Pat. No. 5,460,705.

FIELD OF THE INVENTION

The present invention relates to a process for electrochemically converting anhydrous hydrogen halide to an essentially dry halogen gas using an ionically conducting membrane having passages therein. In particular, this process may be used to produce halogen gas, such as chlorine, bromine, fluorine and iodine, from a respective anhydrous hydrogen halide, such as hydrogen chloride, hydrogen bromide, hydrogen fluoride and hydrogen iodide.

BACKGROUND OF RELATED ART

Hydrogen chloride (HCl) or hydrochloric acid is a reaction by-product of many manufacturing processes which use chlorine. For example, chlorine is used to manufacture polyvinylchloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product. A number of commercial processes have been developed to convert HCl into usable chlorine gas. See e.g., F. R. Minz, "HCl-Electrolysis-Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the "MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

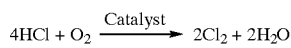

(1)

where the following catalysts may be used, depending on the reaction or process in which equation (1) is used.

| Catalyst | Reaction or Process |
|---|---|
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22 wt % is fed at 65° C. to 80° C. to both compartments of an electrochemical cell, where exposure to a direct current in the cell results in an electrochemical reaction and a decrease in HCl concentration to 17 wt % with the production of chlorine gas and hydrogen gas. A polymeric separator divides the two compartments. The process requires recycling of dilute (17 wt %) HCl solution produced during the electrolysis step and regenerating an HCl solution of 22 wt % for feed to the electrochemical cell. The overall reaction of the Uhde process is expressed by the equation

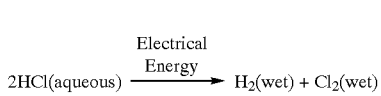

(2)

As is apparent from equation (2), the chlorine gas produced by the Uhde process is wet, usually containing about 1 wt % to 2 wt % water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

(3)

Further, the presence of water in the Uhde system limits the current densities at which the cells can perform to less than 500 amps/ft², because of this side reaction. The result is reduced electrical efficiency and corrosion of the cell components due to the oxygen generated.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

In general, the rate of an electrochemical process is characterized by its current density. In many instances, a number of electrochemical reactions may occur simultaneously. When this is true, the electrical driving force for electrochemical reactions is such that it results in an appreciable current density for more than one electrochemical reaction. For these situations, the reported or measured current density is a result of the current from more than one electrochemical reaction. This is the case for the electrochemical oxidation of aqueous hydrogen chloride. The oxidation of the chloride ions is the primary reaction. However, the water present in the aqueous hydrogen chloride is oxidized to evolve oxygen as expressed in equation (3). This is not a desirable reaction. The current efficiency allows one to describe quantitatively the relative contribution of the current from multiple sources. For example, if at the anode or cathode multiple reactions occur, then the current efficiency can be expressed as:

$$\eta_j = \frac{i_j}{\sum_{j=1}^{NR} i_j} \quad (4)$$

where $\eta_j$ is the current efficiency of reaction j, and where there are NR number of reactions occurring.

For the example of an aqueous solution of HCl and an anode, the general expression above is:

$$\eta_{Cl_2} = \frac{i_{Cl_2}}{i_{Cl_2} + i_{O_2}} \quad (5)$$

$$\eta_{Cl_2} + \eta_{O_2} = 1.0 \quad (6)$$

In the specific case of hydrogen chloride in an aqueous solution, oxidation of chloride is the primary reaction, and oxygen evolution is the secondary reaction. In this case, the current density is the sum of the two anodic reactions. Since $\eta_{O_2}$ is not zero, the current efficiency for chloride oxidation is less than unity, as expressed in equations (7) and (8) below. Whenever one is concerned with the oxidation of chloride from an aqueous solution, then the current efficiency for oxygen evolution is not zero and has a deleterious effect upon the yield and production of chlorine.

$$\eta_{O_2} \neq 0 \quad (7)$$

$$\eta_{Cl_2} = 1.0 - \eta_{O_2} \ldots i_{C_{l^2}} = \eta_{C_{l^2}} \times i_{reported} \quad (8)$$

Furthermore, electrolytic processing of aqueous HCl can be mass-transfer limited. Mass-transfer of species is very much influenced by the concentration of the species as well as the rate of diffusion. The diffusion coefficient and the concentration of species to be transported are important factors which affect the rate of mass transport. In an aqueous solution, such as that used in Balko, the diffusion coefficient of a species is approximately equal to $10^{-5}$ cm$^2$/sec. In a gas, the diffusion coefficient is dramatically higher, with values approximately equal to $10^{-2}$ cm$^2$/sec. In normal industrial practice for electrolyzing aqueous hydrogen chloride, the practical concentration of hydrogen chloride or chloride ion is approximately equal to 17 wt % to 22 wt %, whereas the concentration of hydrogen chloride is 100% in a gas of anhydrous hydrogen chloride. Above 22 wt %, conductance drops, and the power penalty begins to climb. Below 17 wt %, oxygen can be evolved from water, per the side reaction of equation (3), corroding the cell components, reducing the electrical efficiency, and contaminating the chlorine.

A variety of operating parameters have been investigated, including various anode/cathode catalyst pairs, catalyst loadings, membrane types, reactant flow rates, pressures, cell temperature, and cathode humidification levels. One of the main challenges has been keeping the membrane and anode catalyst layers adequately hydrated in the reactors, so that they retain high protonic conductivity and electrode kinetic activity. This is a problem particularly with PEM-based electrochemical reactors because ideally only the cathode side of the cell is humidified, whereas the anode feed is anhydrous hydrogen chloride.

U.S. Pat. No. 5,411,641 uses a cathode current collector with channels to hydrate the membrane and increase the efficiency of proton transport. This system however only provides for partial hydration which limits the overall efficiency of the system.

As higher currents are drawn from the cell, the effect of the electroosmotic drag of water from the anode to the cathode outweighs the diffusional transport of water from the cathode to the anode, eventually depleting the membrane water content near the anode. Water depletion in the membrane increases the membrane resistance, and limits the current. This effect is less apparent in the water saturated cathode embodiment, however, at current densities higher than 1A/cm$^2$, the effect of electro-osmotic drag becomes apparent. See, *Electrochemical Conversion of Anhydrous Hydrogen Chloride to Chlorine in a Proton Exchange Membrane Reactor*. Tatapudi, Electrochemical Soc. Proc. vol. 95–12 p. 142–151.

Another disadvantage of electrochemical conversion of HCl using proton exchange membrane electrochemical reactors, is the poisoning of the cathode catalyst with Cl$^-$ ions resulting from HCl crossover. A system that reduces the level of HCl crossover would be desirable.

Therefore, there is a need for an improved method and apparatus for the electrochemical conversion of anhydrous hydrogon halide gas to essentially dry halogen gas. More particularly, there is a need for a proton conducting membrane that supports high current densities without drying out even when the anode chamber is dry. It would be desirable if the proton conducting ability of the membrane would remain high even if the fluids provided to the cathode chamber are dry, such as when an oxygen depolarized cathode is used. It would be further desirable if the membrane could be used to reduce halide ion crossover from the anode to the cathode.

SUMMARY OF THE INVENTION

The present invention provides an apparatus and process for the direct production of essentially dry halogen gas from anhydrous hydrogen halide using an ion-exchange membrane that is substantially unaffected by water loss due to the electro-osmotic drag of water from the anode to the cathode. The ion-exchange membrane has a passage therein for receiving a hydrating fluid such as water. The process allows for direct processing of anhydrous hydrogen halide, produced as a byproduct of many manufacturing processes, without first dissolving the hydrogen halide in water.

The present invention also provides a process in which chlorine gas ($Cl_2$) is produced from a medium that is essentially water-free using a hydrated ion-exchange membrane. Therefore, in the electrochemical conversion of hydrogen chloride (gas) to chlorine and hydrogen, no appreciable amount of oxygen is produced and the membrane remains hydrated via a passage extending into or through the membrane. Oxidation of water at the anode is an undesirable side reaction which is virtually eliminated in the present invention. Thus, the desired reaction of hydrogen chloride can be run at higher current densities for conversion to chlorine, which translates into higher chlorine production per unit area of electrode.

An advantage of using anhydrous hydrogen chloride in the present invention rather than aqueous hydrogen chloride is that the theoretical cell voltage is lower by at least 0.3 V. This allows the cell to be operated at lower overall cell voltages than cells operated with aqueous hydrogen chloride. This advantage can translate directly into lower power costs per pound of chlorine generated than in the aqueous electrochemical processes of the prior art.

The present invention also provides a process which produces drier chlorine gas with fewer processing steps as compared to chlorine produced by electrochemical or catalytic systems of the prior art, thereby simplifying processing conditions and reducing capital costs.

The present invention further provides a process for converting anhydrous hydrogen chloride to essentially dry chlorine gas in order to recycle chlorine gas back to a manufacturing or synthesis process, thereby eliminating environmental problems associated with the discharge of chloride ions.

In another embodiment of the present invention, there is provided a process for the direct production of essentially dry halogen gas from essentially anhydrous hydrogen halide, wherein molecules of essentially anhydrous hydrogen halide are transported through an inlet of an electrochemical cell. The electrochemical cell comprises an ionically conducting membrane such as a cation-transporting membrane, an anode and a cathode, wherein the anode and the cathode are each disposed in contact with a respective side of the membrane. The molecules of the essentially anhydrous hydrogen halide are oxidized at the anode to produce essentially dry halogen gas and protons. The protons are transported through the membrane of the electrochemical cell and the transported protons are reduced at the cathode. The ionically conducting membrane has an internal passage therein so that a fluid, such as water, can be supplied directly to the passage and into fluid communication with the membrane, thus hydrating the membrane without directly introducing water into the anode or the cathode.

The ionically conducting membrane used in the present invention can be made in accordance with U.S. Pat. No. 5,635,039, issued Jun. 3, 1997, and incorporated by reference herein.

More particularly, the process described above can be employed for the direct production of essentially dry chlorine gas from essentially anhydrous hydrogen chloride.

Furthermore, an oxygen-containing gas may be introduced at the cathode side of the membrane, and when this is done, the protons and oxygen are reduced at the cathode side to form water and/or hydrogen peroxide.

If a portion of the anhydrous hydrogen chloride is unreacted after contacting the cell, the unreacted hydrogen chloride may be separated from the essentially dry chlorine gas and recycled back to the electrochemical cell. In addition, the essentially dry chlorine gas produced by the cell may be utilized in a synthesis process, preferably the same process which produced the starting anhydrous hydrogen chloride.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

In accordance with the present invention, there is provided an electrochemical cell for the direct production of essentially dry halogen gas from anhydrous hydrogen halide. This cell will be described with respect to a preferred embodiment of the present invention, which directly produces essentially dry chlorine gas from anhydrous hydrogen chloride. However, this cell may alternatively be used to produce other halogen gases, such as bromine, fluorine and iodine from a respective anhydrous hydrogen halide, such as hydrogen bromide, hydrogen fluoride and hydrogen iodide. The term "direct" means that the electrochemical cell obviates the need to remove water from the chlorine produced or the need to convert essentially anhydrous hydrogen chloride to aqueous hydrogen chloride before electrochemical treatment. Such a cell is shown generally at 10 in FIG. 1 and at 100 in FIG. 2. With regard to FIGS. 1–5, like elements are numbered the same.

Figure 2:
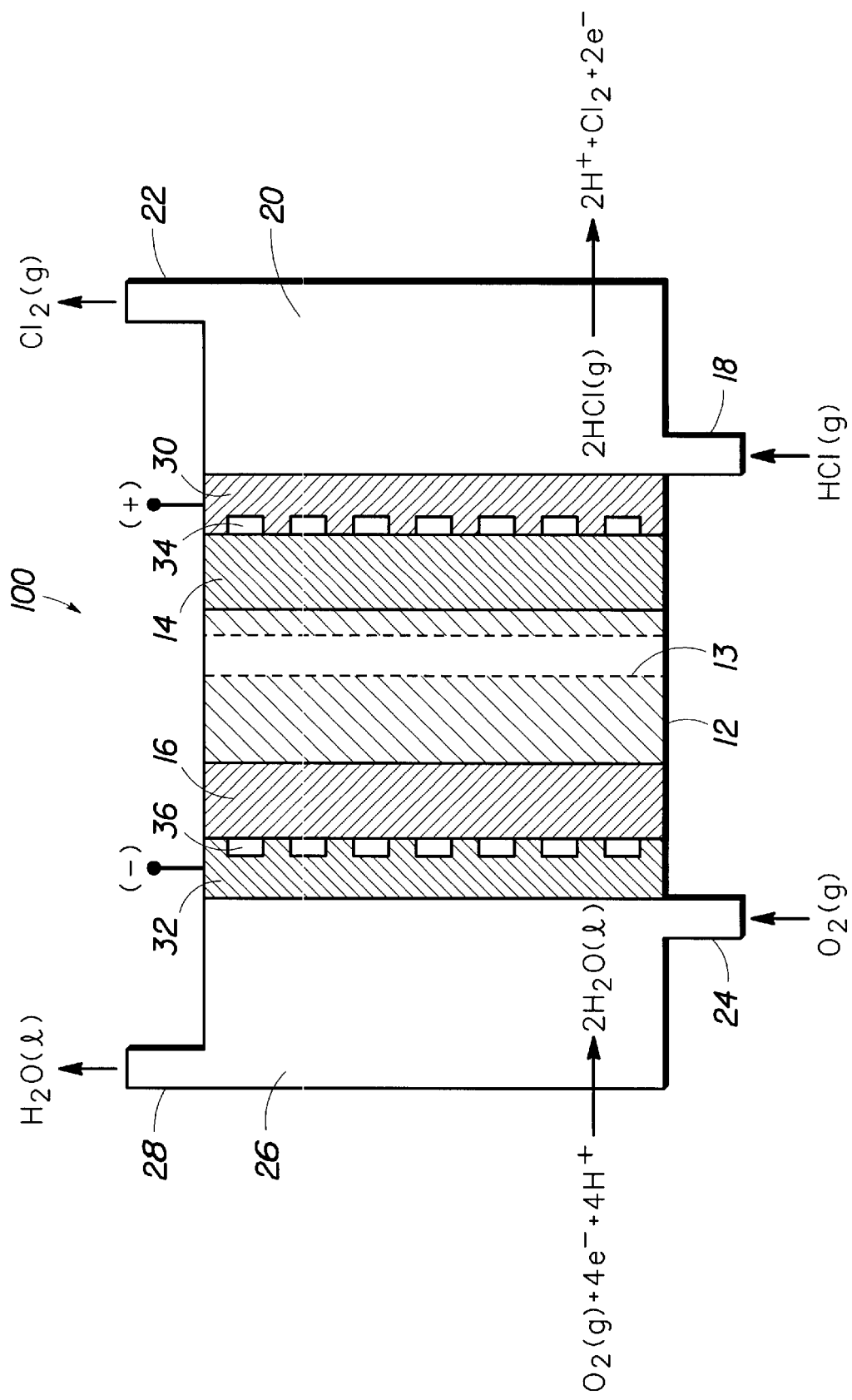
FIG. 2 is a schematic diagram of an electrochemical cell according to a second embodiment of the present invention, which has an ionically conducting membrane with at least one passage therein.

FIG. 2 is a schematic diagram of an electrochemical cell 100 according to one embodiment of the invention, which has an ionically conducting membrane 12 with at least one passage 13 therein.

More specifically, membrane 12 may be a cation conducting membrane. The passage 13 may be formed in the membrane according to the method in U.S. Pat. No. 5,635,039 or U.S. copending patent application Ser. No. 09/009,061 entitled Membrane With Supported Internal Passages, filed Jan. 20, 1998 still pending and incorporated by reference herein. It should be noted that the membrane 12 may contain a plurality of passages 13.

A proton exchange membrane (PEM) with one or more internal passages can be formed in a variety of ways. Briefly, the technique involves pressing ionically conducting material around a plurality of removable elements at sufficient temperature and pressure to fuse the material into a single membrane. After the material is fused, the elements are removed from the membrane to leave a passage for fluid flow. The removable elements may take any shape or form so long as the passages provide fluid directly to the membrane, preferably a substantially uniform flow of fluid throughout the entire membrane. The preferred removable elements are substantially parallel wires or tubes. However, it may be possible to form the passages around elements which are later removed through dissolution.

The walls of the channels in the membrane may be enhanced by adding small tubes that may be permanently placed within the internal channels, in the membrane, at locations that may be subjected to high compression during the assembly of the electrochemical cell.

The permanent tubes are preferably made of non-conductive, inert material, capable of sustaining the compression usually required in assembling and/or operating electrochemical cells used in electrolyzers, and such electrochemical devices. The preferred material for the permanent tubes is polytetrafluoroethylene (PTFE such as TEFLON available from E.I. duPont de Nemours and Company of Wilmington, Del.). The permanent tubes are preferably placed at the ends of each passage in the membrane in order to prevent the openings from collapsing shut.

Figure 5:
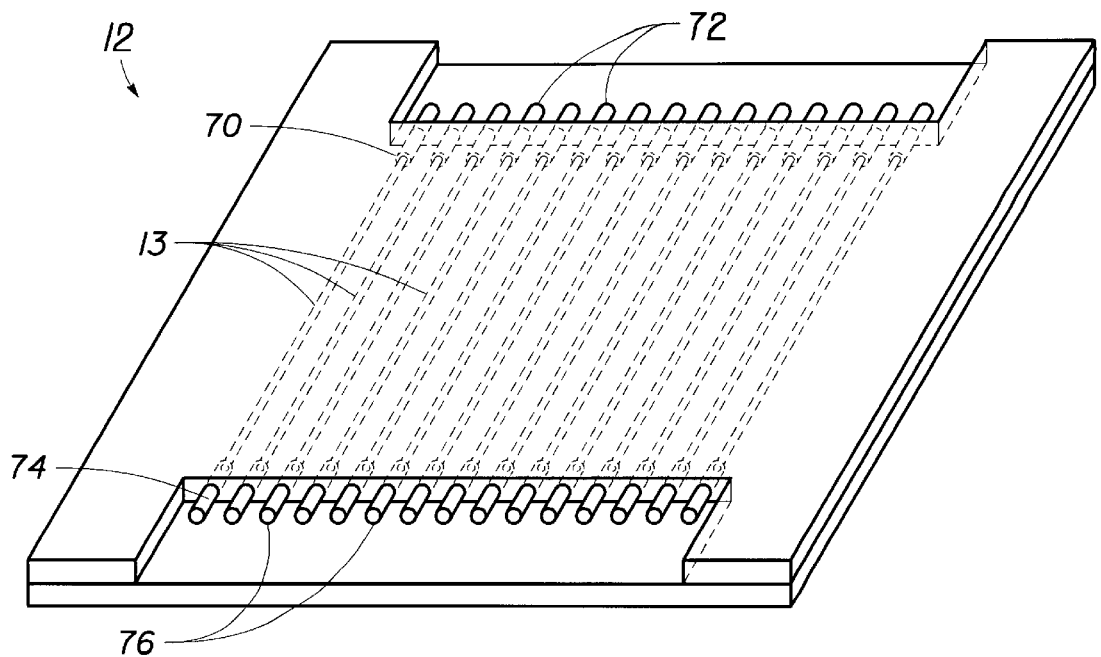
FIG. 5 is perspective view of a membrane with internal passages used in the present invention.

FIG. 5 is a perspective view of a membrane 12 with internal passages 13 that may be used in the present invention. The membrane 12 contains permanent tubes 70 and 74. In operating a cell using the membrane 12, water may be provided to the open ends 72 of the permanent tubes 70 which are provided in fluid communication with the passages 13. Water may be circulated through the passages 13 and exit the membrane 12 at the open ends 76 of the permanent tubes 74 which are also in fluid communication with the passages 13. The passages are preferably substantially open and unobstructed to allow for fluids to flow freely through the passages.

Figure 5A:
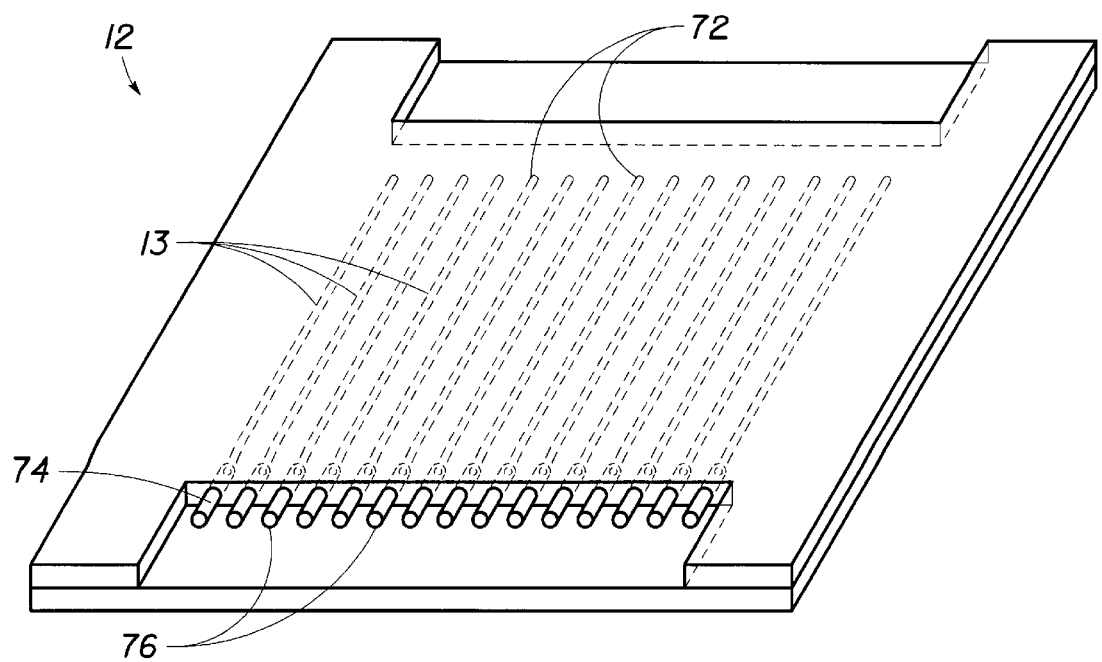
FIG. 5A is a perspective view of an alternative membrane with internal passages used in the present invention.

FIG. 5A is a perspective view of an alternative membrane 12 with internal passages 13 that may be used in the present invention. The membrane 12 contains internal passages with only one set of open ends 76 where the opposing ends 72 are closed. Fluid may be delivered to the passages through the open ends 76, filling the passages 13 to a desired level. The membrane 12 may contain permanent tubes 74 as described above. Since the passages 13 terminate at ends 72 there is no need for the permanent tubes at the ends 72. The passages 13 are preferably substantially open and unobstructed to allow for fluids to flow freely into the passages, it should be clear that the fluid in the passages may be replenished with as the fluid level decreases due to diffusion or electroosmotic drag.

It is preferred, that the passages be positioned closer to the anode side of the membrane due to the increased level of electroosmotic drag through the membrane from the anode to the cathode. Flowing a fluid to the membrane 12, via the passages 13 keeps the membrane from drying out and allows for proton conduction to take place in the absence of water at the anode or the cathode.

The membrane 12 can be made of any proton conducting material benefiting from improved hydration, preferably a fluoro polymer or perfluoropolymer, and most preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type $-CF_2CFRSO_3H$ and $-OCF_2CF_2CF_2SO_3H$, where R is selected from F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)OCF_2CF_2SO_3H$. Sometimes those resins may be in a form that has pendant $-SO_2F$ groups, rather than $-SO_3H$ groups. The sulfonyl fluoride groups can be hydrolyzed with a strong base, for example potassium hydroxide forming $-SO_3K$ groups, which may then be exchanged with an acid to give $-SO_3H$ groups. Suitable cationic membranes, which are made of hydrated copolymers of polytetrafluoroethylene and poly-sulfonyl fluoride vinyl ether-containing pendant sulfonic acid groups, are offered by E. I. duPont de Nemours and Company of Wilmington, Del. under the trademark "NAFION" (hereinafter referred to as NAFION). In particular, NAFION membranes containing pendant sulfonic acid groups include NAFION 117, NAFION 324, NAFION 417, and NAFION 105.

The first type of NAFION is unsupported and has an equivalent weight of 1100 g., equivalent weight being defined as the amount of resin required to neutralize one liter of a 1M sodium hydroxide solution. The other two types of NAFION are both supported on a fluorocarbon fabric, the equivalent weight of NAFION 417 also being 1100 g. NAFION 324 has a two-layer structure, a 125 μm-thick membrane having an equivalent weight of 1100 g., and a 25 μm-thick membrane having an equivalent weight of 1500 g. There also is offered a NAFION 117F grade, which is a precursor membrane having pendant $SO_2F$ groups that can be converted to sulfonic acid groups.

Although the present invention describes the use of a proton conducting polymer electrolyte membrane, it is within the scope of the invention to use other ionically conducting membranes which are not polymeric. For example, proton-conducting ceramics such as beta-alumina may be used. Beta-alumina is a class of nonstoichiometric crystalline compounds having the general structure $Na_2O_x Al_2O_3$, in which x ranges from 5 ($\beta''$-alumina) to 11 ($\beta$-alumina). This material and a number of solid electrolytes which are useful for the invention are described in the Fuel Cell Handbook, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O^-_{3-d}$) and barium neodymiate cerate ($BaCe_{0.9}Nd_{0.01}O\ 3_{alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

Electrochemical cell 10 also comprises a pair of electrodes, specifically, an anode 14 and a cathode 16, each disposed in contact with a respective side of the membrane 12 as shown in FIG. 2. Anode 14 has an anode inlet 18 which leads to an anode chamber 20, which in turn leads to an anode outlet 22. Cathode 16 has a cathode inlet 24 which leads to a cathode chamber 26, which in turn leads to a cathode outlet 28. It is well known to one skilled in the art that if electrodes are placed on opposite faces of a membrane, cationic species (protons in the HCl reaction being described) are transported through the membrane from anode to cathode, while each electrode carries out a half-cell reaction. In the present invention, molecules of anhydrous hydrogen chloride are transported to the surface of the anode through inlet 18. The molecules of the anhydrous hydrogen chloride are oxidized to produce essentially dry chlorine gas and protons. The essentially dry chlorine gas exits through anode outlet 22. The protons are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the ionically conducting membrane 12. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium, tin, tantalum, pyrolyzed carbon-supported cobalt macrocyclics, zirconium, and the oxides, alloys or mixtures thereof. The phrase "mixtures comprising any of these elements, oxides and alloys" means at least one of these elements, oxides and alloys mixed with at least one of any other of these elements, oxides and alloys and/or any other constituent. However, in general, the oxides of these materials are not used for the cathode. Other catalyst materials suitable for use with the present invention may include, but are not limited to, transition metal macrocycles in monomeric and polymeric forms and transition metal oxides, including perovskites and pyrochlores.

In a hot-pressed electrode, the electrochemically active material may comprise a catalyst material on a support material. The support material may comprise particles of carbon and particles of PTFE. The electrochemically active material may be bonded by virtue of the PTFE to a support structure of carbon paper or graphite cloth and hot-pressed to the ionically conducting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 2.50 $mg/cm^2$. Lower loadings are possible with other available methods of deposition, such as distributing them as thin films from inks onto the membranes, where the inks contain solubilized PFSA ionomer to enhance the catalyst-ionomer surface contact and to act as a binder to the PFSA membrane sheet. With such a system, loadings as low as 0.017 mg active material per $cm^2$ have been achieved.

Figure 1:
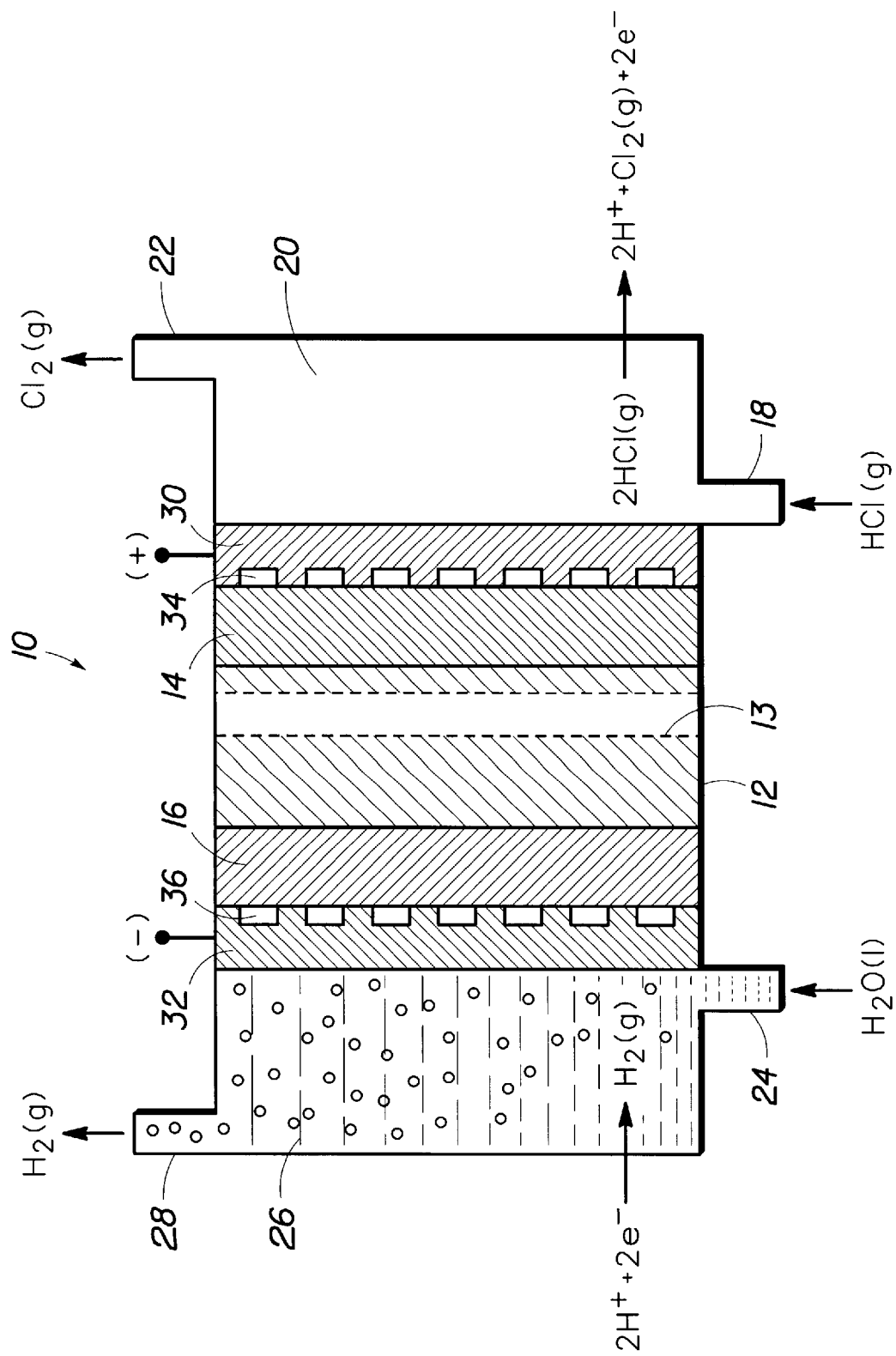
FIG. 1 is a schematic diagram of an electrochemical cell according to one embodiment of the present invention, which has an ionically conducting membrane with at least one passage therein.

Current collectors 30, 32, are disposed in electrical contact with the anode 14 and the cathode 16, respectively, for collecting or distributing electronic charge. Another function of the current collectors is to direct anhydrous hydrogen chloride to the anode. Inlet 24 is not necessary for the delivery of water to the cathode to keep the membrane hydrated if the membrane 12 shown in FIGS. 1 or 2 is used. More specifically, the current collectors 30, 32 may be machined with flow channels 34, 36 as shown in FIG. 1 for directing the anhydrous HCl to the anode 14 and oxidant to the cathode 16. It is within the scope of the present invention that the current collectors and the flow channels may have a variety of configurations. Also, the current collectors may be made in any manner known to one skilled in the art. For example, the current collectors may be machined from graphite blocks impregnated with epoxy to keep the hydrogen chloride and chlorine from diffusing through the block. This impregnation also prevents oxygen and water from leaking through the blocks. The current collectors may also be made of a porous carbon in the form of a foam, cloth or matte. The current collectors may also include thermocouples or thermistors (not shown) to monitor and control the temperature of the cell. The materials for fabricating and configurations of current collectors are well known to those of skill in the art.

The electrochemical cell also comprises a structural support for holding the cell together. Preferably, the support comprises a pair of backing plates which compress the cell components to high pressures to reduce the contact resistances between the current collectors and the electrodes. The plates may be made of aluminum, but are preferably a corrosion-resistant metal or alloy. A non-conducting element, such as PTFE or other electronic insulator, is disposed between the collectors and the backing plates.

The electrochemical cell further comprises a voltage source (not shown) for supplying a voltage to the cell. The voltage source is attached to the cell through current collectors 30 and 32 as indicated by the positive (+) and negative (−) terminals, respectively, as shown in FIG. 2.

When more than one anode-cathode pair is used, such as in a commercial manufacturing process, a bipolar arrangement is preferred. In the simple cell shown in FIG. 2, a single anode and cathode are shown. The current flows from the external voltage source to the cathode and returns to the external source through the lead connected to the anode. With the stacking of numerous anode-cathode pairs, it is in convenient to supply the current in this fashion. Hence, for a bipolar arrangement, the current flows through the cell stack. This is accomplished by having the current collector for the anode and the cathode machined from one piece of material. Thus, on one face of the current collector, the gas (HCl) for the anode flows in machined channels past the anode. On the other face of the same current collector, channels are machined or otherwise provided, and the current produced by the anodic reaction on one side of the current collector/bipolar plate is used in the cathodic reaction, which typically produces hydrogen, water or hydrogen peroxide. The current flows through the repeating units of a cell stack without the necessity of removing and supplying current to each individual cell. The material selected for the current collector must be resistant to the oxidizing conditions on the anode side and the reducing conditions on the cathode side. Of course, the material must be electronically conductive. In a bipolar configuration, electronic insulators are not interspersed in the stack as described above. Rather, there are backing plates at the ends of the stack, and these may be insulated from the adjacent current collectors.

Further in accordance with the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane made of a material other than PFSA should be used.

The operation of the electrochemical cell will now be described as it relates to a preferred embodiment of the process of the present invention, where the anhydrous hydrogen halide is hydrogen chloride. Referring to FIG. 1, molecules of essentially anhydrous hydrogen chloride gas are transported to the surface of the anode through anode inlet 18 and through gas channels 34. Water is delivered to the passage 13 to hydrate the membrane and thereby increase the efficiency of proton transport through the membrane. Molecules of the anhydrous hydrogen chloride (HCl (g)) are oxidized at the anode under the potential created by the voltage source to produce essentially dry chlorine gas (Cl$_2$(g)) at the anode, and protons (H$^+$). This reaction is given by the equation

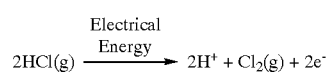
(9)

The chlorine gas (Cl$_2$(g)) exits through anode outlet 22. The protons (H$^+$) are transported through the membrane, which acts as an electrolyte. The transported protons are reduced at the cathode. This reaction is given by the equation:

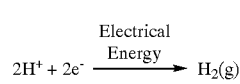
(10)

The hydrogen which is evolved at the interface between the electrode and the membrane exits via cathode outlet 28. The hydrogen bubbles through the water and is not affected by the PFSA in the electrode.

Figure 1A:
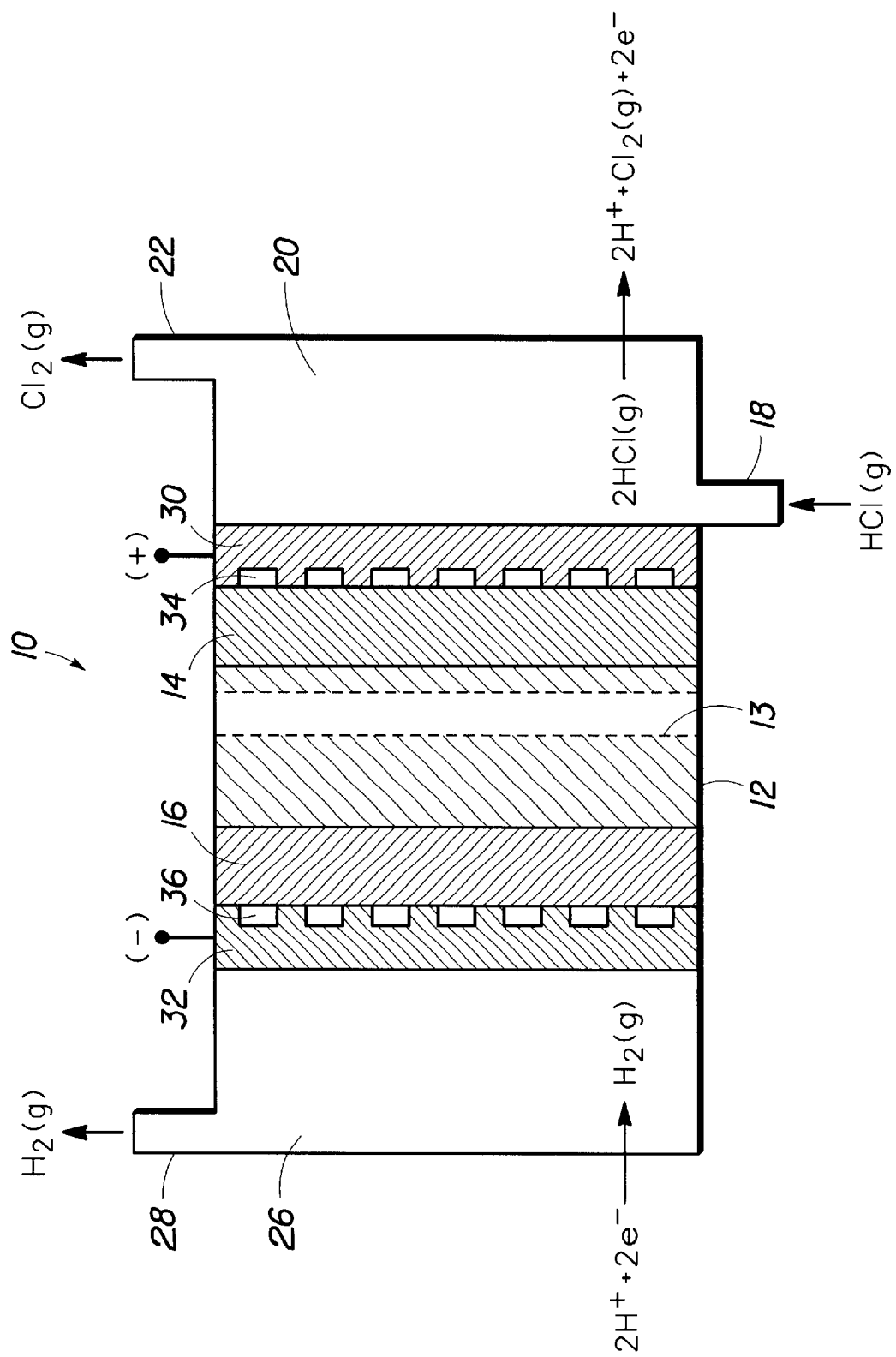
FIG. 1A is a schematic diagram of the electrochemical cell of FIG. 1, modified to produce hydrogen gas at the cathode without the addition of water.

Referring to FIG. 1A, H$_2$(g) is produced at the cathode in the absence of H$_2$O. The membrane is hydrated through passage 13, thus eliminating the need for additional H$_2$O at the cathode.

In accordance with another embodiment of the present invention, there is provided an electrochemical cell for the direct production of essentially dry halogen gas from anhydrous hydrogen halide as described above. In this embodiment, water and/or hydrogen peroxide, as well as chlorine gas, is produced by the cell.

Where the anhydrous hydrogen halide is hydrogen chloride, molecules of essentially anhydrous hydrogen chloride are transported to the anode through anode inlet 18 and through gas channels 34 as shown in FIG. 2. An oxygen-containing gas, such as oxygen (O$_2$(g)), air or oxygen-enriched air (i.e., greater than 21 mol % oxygen in nitrogen) may be introduced through cathode inlet 24 as shown in FIG. 2 and through channels 36 formed in the cathode current collector. Although air is cheaper to use, cell performance is enhanced when enriched air or oxygen is used. This cathode feed gas does not need to be humidified to aid in the control of moisture in the membrane. Molecules of the hydrogen chloride (HCl(g)) are oxidized under the potential created by the voltage source to produce essentially dry chlorine gas at the anode, and protons (H$^+$) as expressed in equation (9) above. The chlorine gas (Cl$_2$) exits through anode outlet 22 as shown in FIG. 2. The protons (H$^+$) are transported through the membrane, which acts as an electrolyte. Oxygen and the transported protons can be reduced at the cathode to water, which is expressed by the equation:

$$O_2(g)+4e^-+4H^+\rightarrow 2H_2O(l) \qquad (11)$$

The water formed (H$_2$O (l) in equation (11) exits via cathode outlet 28 as shown in FIG. 2, along with any nitrogen and unreacted oxygen.

In an oxygen depolarized cathode, the cathodic reaction is typically the formation of water. This cathode reaction has the advantage of more favorable thermodynamics relative to H$_2$ production at the cathode as in the first embodiment. This is because the overall reaction in this embodiment, which is expressed by the following equation:

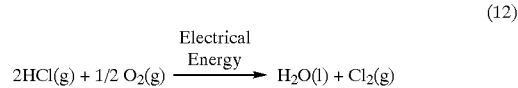
(12)

involves a smaller free-energy change than the free-energy change for the overall reaction in the first embodiment, which is expressed by the following equation:

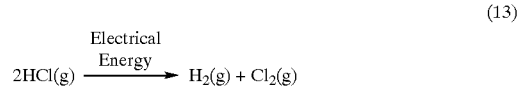
(13)

Thus, the amount of voltage or energy required as input to the cell is reduced in an oxygen depolarized mode.

The membrane of the present invention must be hydrated in order to have efficient proton transport. Thus, the process of the present invention includes the step of keeping the membrane moist to increase the efficiency of proton transport through the membrane. Hydration is achieved by supplying a fluid such as water to the passage 13 in the ionically conducting membrane as discussed above. Adequate hydration of the membrane keeps the conductivity of the membrane high. In addition, flowing fluid through the passage 13 aids in the removal of crossover HCl or chloride ions (Cl⁻) and removes at least some of the heat generated in the electrochemical cell.

In another aspect of the present invention, the catalyst layer on the cathode side of the membrane is preferably comprised of a proton exchange polymer, polytetraflouorethylene polymer and a metalloporphyrin. For the production of $H_2O_2$, pyrolyzed carbon-supported cobalt porphyrins are particularly preferred. The cathodic reaction involving the two-electron reduction of oxygen to hydrogen peroxide is given below:

$$O_2 + 2H^+ + 2e^- \rightarrow H_2O_2 \quad (14)$$

Figure 2A:
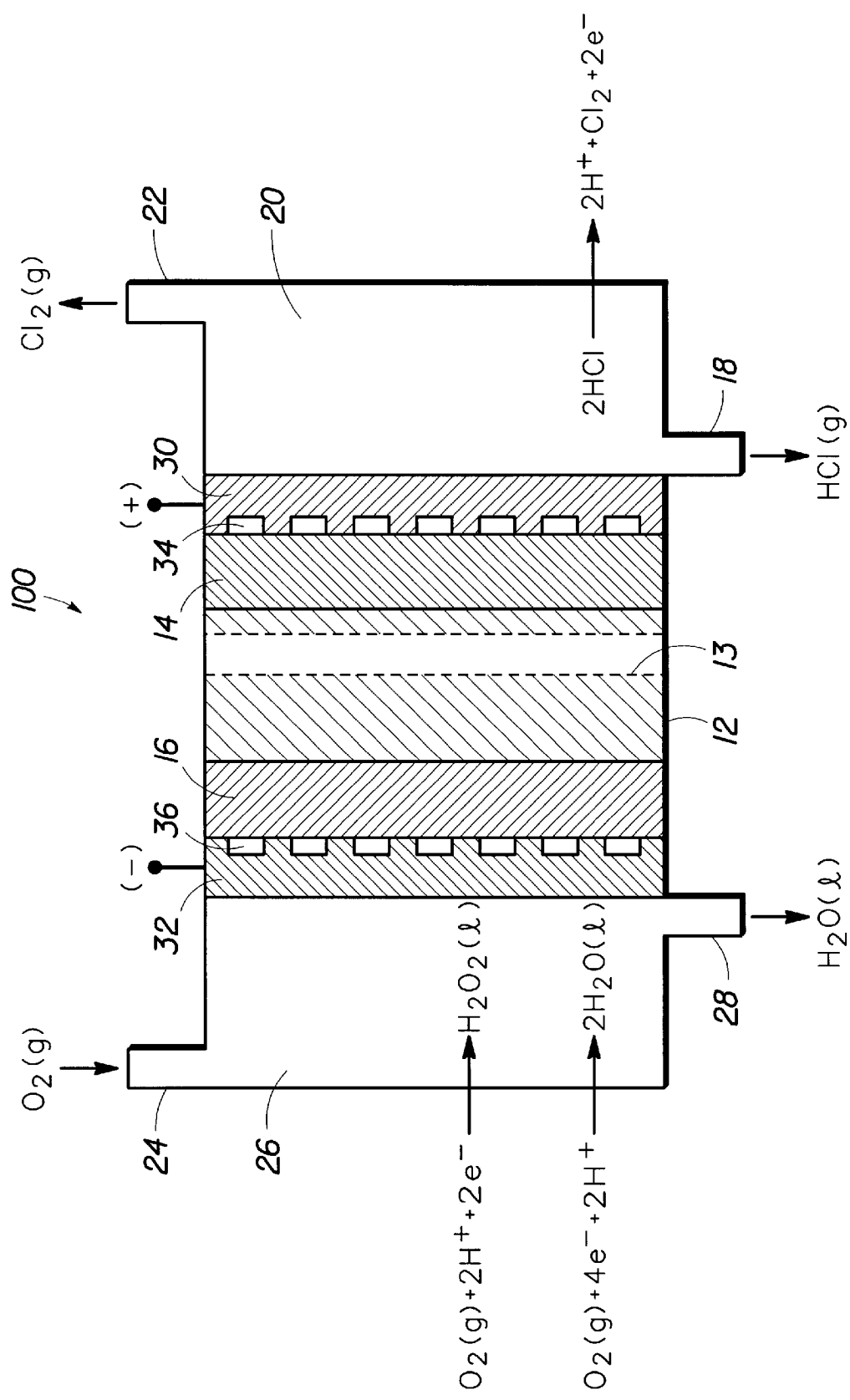
FIG. 2A is a schematic diagram of an electrochemical cell according to a third embodiment of the present invention, which has an ionically conducting membrane with at least one passage therein.

Referring to FIG. 2A, oxygen is fed to inlet 24 and converted at the cathode to $H_2O_2$ and $H_2O$. The $H_2O$ and $H_2O_2$ produced are drained off through outlet 28. Therefore, the protons and electrons released from the production of $Cl_2(g)$ at the anode can be used to produce both $H_2O$ and $H_2O_2$ at the cathode, with the ratios of $H_2O$ and $H_2O_2$ production being determined largely by the cathodic catalyst.

Cobalt tetrakis(4-methoxyphenyl) porphyrin (CoTTMP), although water soluble, adsorbs irreversibly on the surface of carbon or graphite particles and acts as a catalyst that supports the two-electron reduction of oxygen to hydrogen peroxide ($H_2O_2$). The catalytic effect is observed to occur close to the potential of the redox transition for the central ion $Co(3^+)/Co(2^+)$. However, two different intermediates are formed depending on the stoichiometric ratio between the macromolecule and oxygen. These intermediates are then reduced electrochemically at more negative potentials to release hydrogen peroxide.

In any of the embodiments, the electrochemical cell can be operated over a wide range of temperatures. Room temperature operation is an advantage, due to the case of use of the cell. However, operation at elevated temperatures provides the advantages of improved kinetics and increased electrolyte conductivity. It should be noted also that one is not restricted to operate the electrochemical cell at atmospheric pressure. The cell could be run at differential pressure gradients, which change the transport characteristics of water or other components in the cell, including the membrane.

The electrochemical cell of the present invention can be operated at higher temperatures at a given pressure than electrochemical cells operated with aqueous hydrogen chloride of the prior art. This affects the kinetics of the reactions and the conductivity of the PFSA. Higher temperatures result in lower cell voltages. However, limits on temperature occur because of the properties of the materials used for elements of the cell. For example, the properties of a PFSA membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

Figure 3:
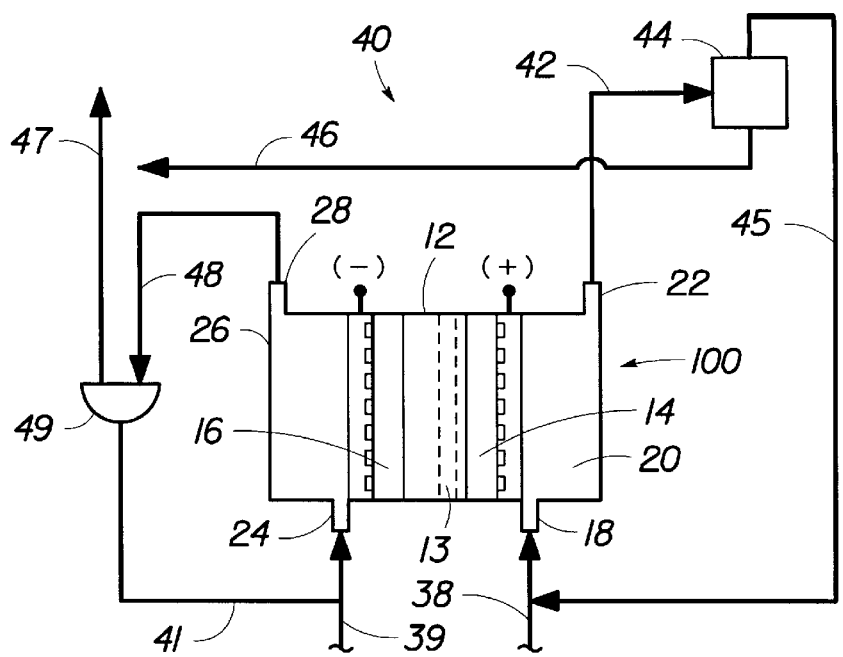
FIG. 3 is a schematic diagram of a system which separates a portion of unreacted hydrogen chloride from the essentially dry chlorine gas and recycles it back to the electrochemical cell of FIG. 2.

In the present invention, a portion of the anhydrous hydrogen chloride may be unreacted after contacting the cell and may exit the cell through the anode outlet along with the chlorine gas. FIG. 3 shows a system 40 for recycling unreacted anhydrous hydrogen chloride from essentially dry chlorine gas using the cell shown in FIG. 1. It should be noted that the system 40 could be used to recycle other unreacted anhydrous hydrogen halides from a respective essentially dry halogen gas, such as fluorine, bromine or iodine, with chlorine gas being used only as a representative halogen gas. The system 40 recycles the unreacted anhydrous hydrogen chloride back to cell 100, which includes membrane 12 with passage 13, anode 14, anode chamber 20, cathode 16 and cathode chamber 26 as described above. Cell 100 also includes current collectors 30, 32, a feed line 38 for providing anhydrous hydrogen chloride and an optional feed line 39 for feeding water, oxygen or air. The unreacted portion of the anhydrous HCl is separated from the essentially dry chlorine gas by a separator 44 in a separation process which may involve distillation, adsorption, extraction, membrane separation or any number of known separation techniques. The separated, unreacted portion of anhydrous HCl in the essentially dry chlorine gas is recycled through a line 45 back to anode inlet 18 of electrochemical cell 10. The separated chlorine gas exits through a line 46. In the system of FIG. 3, hydrogen gas ($H_2$) exits cell 100 through cathode outlet 28 as described with respect to the first embodiment and through a line 48. Excess water may also exit through cathode outlet 28, where it is separated from hydrogen gas in a knock-out tank 49 and optionally recycled to cathode inlet 24 through a line 41. The separated hydrogen gas exits through a line 47. It should be understood that the cell 100 of the second embodiment of the present invention alternatively could be used in the system of FIG. 3, except that oxygen gas ($O_2$) would enter the cathode inlet from feed line 39, and water ($H_2O(l)$), along with any nitrogen and unreacted oxygen, would exit the cathode outlet.

Figure 4:
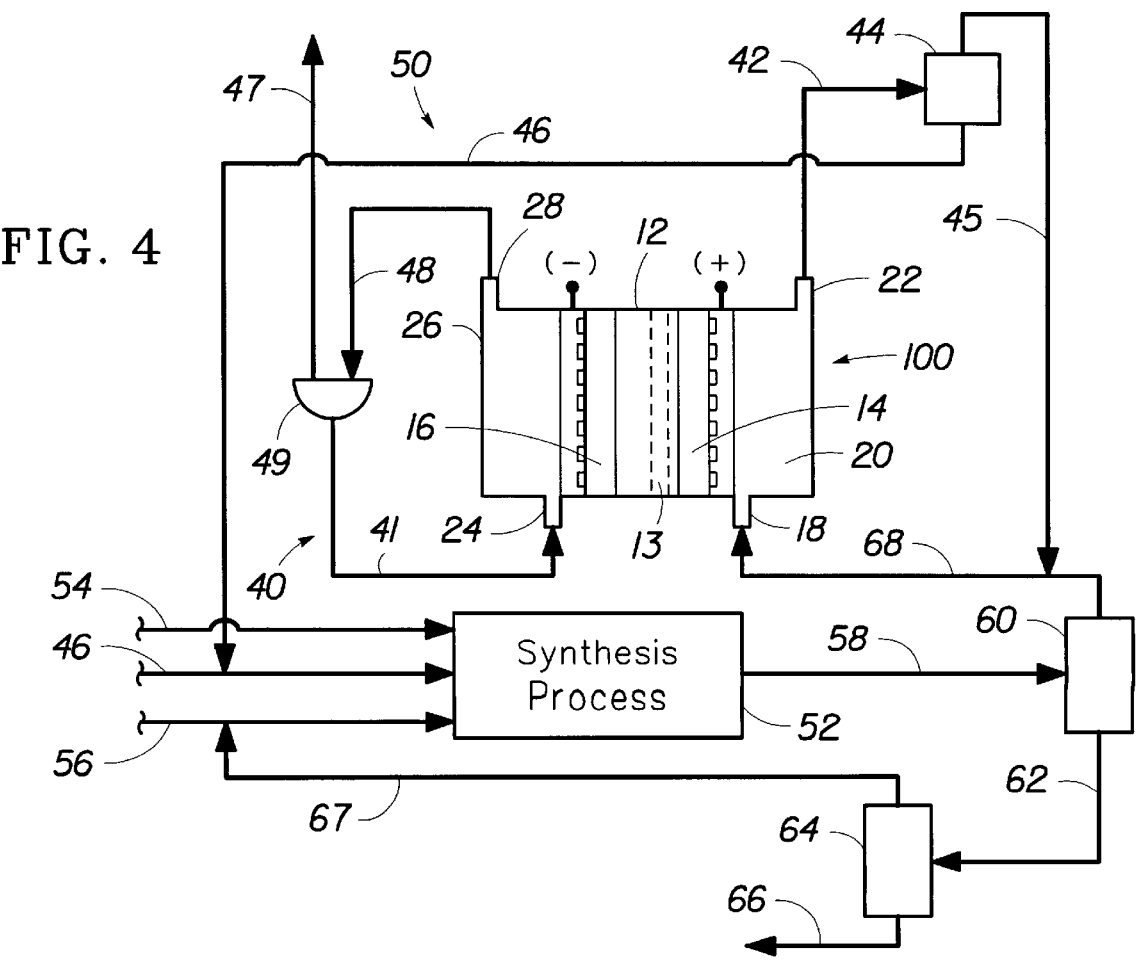
FIG. 4 is a schematic diagram of a modification to the system of FIG. 3 which includes a synthesis process which produces anhydrous hydrogen chloride as a by-product and where the essentially dry chlorine gas is recycled to the synthesis process, and the unreacted hydrogen chloride is recycled back to the electrochemical cell of FIG. 2.

A modification of the system 40 involves recycling the essentially dry chlorine gas which has been separated from the unreacted anhydrous hydrogen chloride to a synthesis process where chlorine is a reactant and anhydrous hydrogen chloride is a by-product. This modification is illustrated in FIG. 4, where a system 50 recycles separated chlorine gas to a synthesis process. System 50 includes system 40 as described above, as well as a synthesis process 52 and other components associated therewith as described below. Essentially dry chlorine gas is recycled through a line 46 as described above to synthesis process 52. Other reactant inlet lines are shown at 54 and 56. For instance, in a hydrofluorination process, inlet line 54 could bring in hydrocarbon, and inlet line 56 could bring in hydrogen fluoride (HF). Fluorinated hydrocarbons, unreacted HF and anhydrous hydrogen chloride exit process 52 through a line 58 and are separated in a separator 60 by any known separation process. The anhydrous hydrogen chloride is fed to anode inlet 18 through a line 68 and is combined with a recycled stream in line 45 as shown in FIG. 4. Fluorinated hydrocarbons and unreacted HF exit separator 60 via a line 62 and flow to a further separator 64, which separates the fluorinated hydrocarbons from the unreacted HF. The fluorinated hydrocarbons exit separator 64 through a line 66. The unreacted HF is recycled back to synthesis process 52 through a line 67, which joins up with inlet line 56. This system could also be used for bringing in hydrochlorofluorocarbons or chlorofluorocarbons plus hydrogen and a hydrodechlorination catalyst to produce hydrogen chloride. It is, of course, within the scope of the present invention alternatively to use the cell of the second embodiment in the system of FIG. 4 with the differences to the system as noted above.

The electrode/membrane assemblies suitable for use in the embodiments of the present invention are commercially available from Giner, Inc. of Waltham, Mass., as membrane and electrode assemblies (MEAs) containing 0.35 mg precious metal per cm² and integrally bonded to NAFION 117 membrane in the H⁺form. Electrodes as described in U.S. Pat. No. 4,210,501 may also be used with the present invention. It is also within the scope of the present invention to use other known metallization techniques in making electrodes for use with the present invention. For example, the technique used in U.S. Pat. No. 4,959,132 to Fedkiw, frequently referred to as Impregnation-Reduction, is an appropriate method to use with the present invention. Alternatively, the metallization technique may be used, as described in Japanese Publication No. 38934, published in 1980 and also in the Int. J. Hydrogen Energy, 5,397 (1982).

Figure 6:
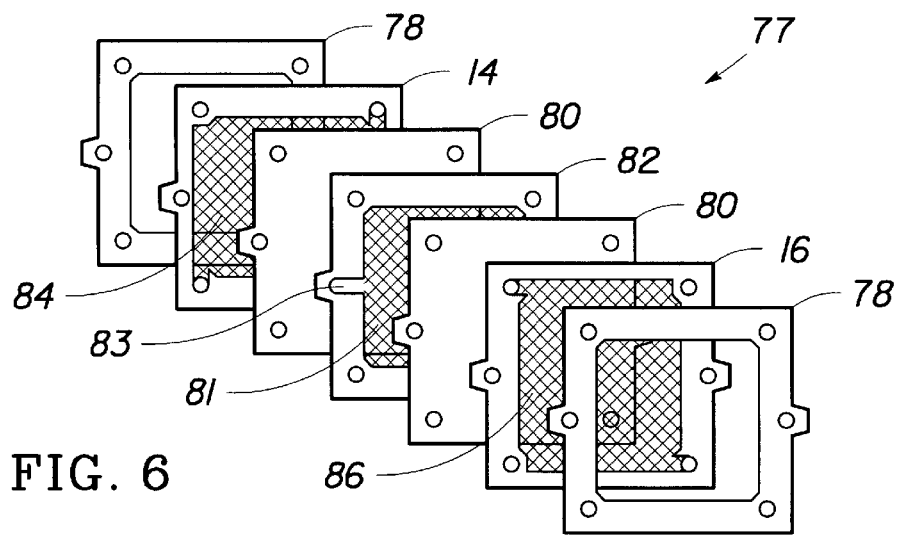
FIG. 6 is an exploded perspective view of a fluid cooled bipolar plate arrangement.

Now referring to FIG. 6, a fluid cooled bipolar plate 77 is shown assembled from a series of generally planar components including two cooling fluid barriers 80 and a cooling fluid frame 82, with an electrically conducting flowfield 81 therein, such as an expanded metal mesh or a porous metal foam. Optionally, the fluid cooled bipolar plate 77 may further include an anode cell frame 14 having a flowfield/current collector 84, cathode cell frame 16 having a flowfield/current collector 86 and sealing plates 78. This version of the bipolar plate includes an internal cooling flowfield 81 for cooling the stack. The cooling fluid flows from a cooling fluid inlet manifold (not shown) through an inlet 83 to the cooling flowfield 81 within the cooling fluid frame 82, and through an outlet 84 (see FIG. 7) to a cooling fluid outlet manifold generally opposed from the inlet manifold. The temperature in a stack of electrochemical cells having this bi-polar plate configuration can be controlled by flowing a fluid through the cooling flowfield. The fluid may be a heat transfer fluid, such as DOWTHERM (a trademark of Dow Chemical Company, Midland, Mich.), but is preferably water. The temperature of the cell stack can thus be controlled by controlling the temperature of the fluid that is flown through the bipolar plate 77. The source of fluid may be the same source as the water that is transferred to the passages 13 in the membrane 12 or it may come from a separate source, perhaps at different temperatures.

Figure 7:
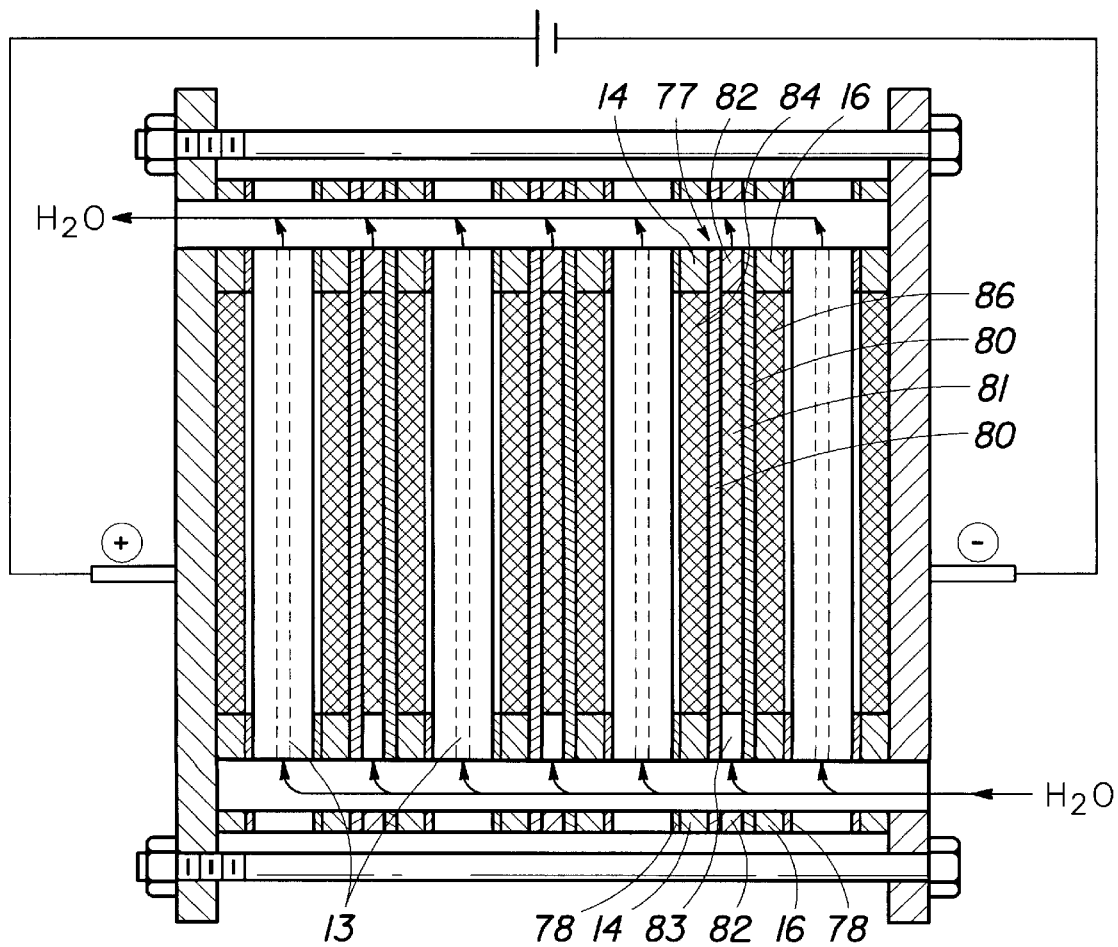
FIG. 7 is a schematic diagram of a stack of electrochemical cells according to the present invention separated by water cooled bi-polar plates.

Now referring to FIG. 7, any of the electrolytic cells disclosed herein may be used in multiple cell stacks. The individual cells can be separated by a bi-polar plate, preferably a water cooled bipolar plate 77 like that discussed above. Water flows into one end of the stack through the passages 13 and back out of the opposite end of the stack. The water acts to hydrate the membrane 12 as well as provide some temperature control. Furthermore, a heat transfer fluid, such as the same source of water, flows into the inlet 83, through the cooling flowfield 81, and out the outlet 84 in the water outlet manifold.

Additional advantages and modifications will be readily apparent to those skilled in the art. The invention, in its broader aspects, is, therefore, not limited to the specific details, representative apparatus and processes described. Accordingly, departures may be made from such details without departing from the spirit or scope of the general inventive concept as defined by the appended claims and their equivalents.

While the foregoing is directed to the preferred embodiment of the present invention, other and further embodiments of the invention may be devised without departing from the basic scope thereof, and the scope thereof is determined by the claims that follow.

What is claimed is:

1. A process for the direct production of essentially dry halogen gas from essentially anhydrous hydrogen halide, comprising:

(a) providing molecules of essentially anhydrous hydrogen halide to an inlet of an anode of an electrochemical cell;

(b) oxidizing the molecules of essentially anhydrous hydrogen halide at the anode to produce essentially dry halogen gas and protons;

(c) transporting the protons through an ionically conducting membrane of the electrochemical cell, wherein the ionically conducting membrane has a passage therein;

(d) flowing a fluid into fluid communication with the passage in the ionically conducting membrane; and (e) reducing the transported protons at a cathode of the electrochemical cell.

2. The process of claim 1, wherein the hydrogen halide is selected from hydrogen chloride, hydrogen bromide, hydrogen fluoride and hydrogen iodide and mixtures thereof.

3. The process of claim 1, wherein the fluid is water.

4. The process of claim 1, wherein the passage is positioned near the anode of the cell.

5. The process of claim 1, wherein the protons are reduced to form hydrogen gas.

6. The process of claim 1, further comprising introducing oxygen to the cathode; wherein the protons and oxygen are reduced at the cathode.

7. The process of claim 6, wherein the protons and oxygen are reduced to form water, hydrogen peroxide or mixtures thereof.

8. The process of claim 6, wherein the membrane comprises a plurality of passages.

9. The process of claim 6, wherein the passage is substantially open.

10. A process for recycling unreacted anhydrous hydrogen halide generated from the direct production of essentially dry halogen gas from essentially anhydrous hydrogen halide, comprising:

(a) providing molecules of essentially anhydrous hydrogen halide to an inlet of an electrochemical cell and transporting the molecules to an anode of the cell;

(b) oxidizing a portion of the essentially anhydrous hydrogen halide at the anode to produce essentially dry halogen gas and protons;

(c) transporting the protons through an ionically conducting membrane of the electrochemical cell, wherein the ionically conducting membrane has a passage therein;

(d) supplying a fluid to the passage in the membrane;

(e) reducing the transported protons at a cathode of the electrochemical cell;

(f) separating an unreacted portion of the essentially anhydrous hydrogen halide from the essentially dry halogen gas; and (g) passing the unreacted portion of the anhydrous hydrogen halide back to the anode.

11. The process of claim 10, wherein the membrane comprises a plurality of passages.

12. The process of claim 10, further comprising recycling the essentially dry halogen gas through a synthesis process to produce anhydrous hydrogen halide as a by-product.

13. A process for recycling essentially dry halogen gas to a synthesis process, where the essentially dry halogen gas is generated directly from essentially anhydrous hydrogen halide comprising:

(a) providing molecules of essentially anhydrous hydrogen halide to an inlet of an electrochemical cell and transporting the molecules to an anode of the cell;

(b) oxidizing a portion of the essentially anhydrous hydrogen halide at the anode to produce essentially dry halogen gas and protons;

(c) transporting the protons through an ionically conducting membrane of the electrochemical cell wherein the ionically conducting membrane has a passage therein;

(d) supplying a fluid to the passage in the membrane;

(e) reducing the transported protons at a cathode of the electrochemical cell; and (f) recycling the essentially dry halogen gas through a synthesis process and producing anhydrous hydrogen halide as a by-product.

14. The process of claim 13, wherein the membrane comprises a plurality of passages.

15. An electrochemical cell for the direct production of essentially dry halogen gas from essentially anhydrous hydrogen halide, comprising:

(a) an anode for oxidizing molecules of essentially anhydrous hydrogen halide to produce essentially dry halogen gas and protons;

(b) a cation-transporting member for transporting the protons therethrough, wherein the anode is disposed in contact with one side of the cation-transporting means;

(c) a passage in the cation-transporting member for hydrating the cation-transporting member; and (d) a cathode for reducing the transported protons, wherein the cathode is disposed in contact with the other side of the cation-transporting member.

16. The electrochemical cell of claim 15, wherein the cation-transporting member is an ionically conducting membrane.

17. The electrochemical cell of claim 15, wherein the anode and the cathode comprise gas-diffusion electrodes.

18. The electrochemical cell of claim 15, wherein the anode and the cathode comprise electrochemically active materials disposed adjacent to a surface of the ionically conducting membrane.

19. The electrochemical cell of claim 18, wherein a thin film of the electrochemically active material is applied directly to the membrane on a surface thereof.

20. The electrochemical cell of claim 18, wherein the electrochemically active material is deposited into the membrane on a surface thereof.

21. The electrochemical of claim 18, wherein the electrochemically active material of the anode and the cathode comprises a catalyst material on a support material.

22. The electrochemical of claim 21, wherein the support material comprises carbon.

23. The electrochemical cell of claim 21, wherein the catalyst material comprises a component selected from platinum, ruthenium, osmium, rhenium, rhodium, iridium, palladium, gold, titanium, tin, tantalum, zirconium, and pyrrolyzed carbon-supported cobalt macrocyclics and the oxides, alloys and mixtures thereof.

24. A process for the direct production of essentially dry halogen gas from essentially anhydrous hydrogen halide, comprising:

(a) providing molecules of essentially anhydrous hydrogen halide to an inlet of an electrochemical cell and transporting the molecules to an anode of the cell;

(b) oxidizing the molecules of the essentially anhydrous hydrogen halide at the anode to produce essentially dry halogen gas and protons;

(c) transporting the protons through an ionically conducting membrane of the electrochemical cell to a cathode, wherein the ionically conducting membrane has a passage extending therein, the membrane further having an anode side and a cathode side;

(d) introducing a gas containing oxygen at the cathode side of the membrane; and (e) reducing the transported protons and oxygen at the cathode.

25. The process of claim 24, further comprising, supplying a fluid to the passage to increase the efficiency of proton transport through the membrane.

26. The process of claim 25, wherein the fluid is water.

27. The process of claim 24, wherein the cathode and the anode comprise gas-diffusion electrodes.

28. The process of claim 27, wherein the anode and the cathode comprise an electrochemically active material disposed adjacent to the surface of the ionically conducting membrane.

29. The process of claim 28, wherein a thin film of the electrochemically active material is applied directly to the membrane.

30. The process of claim 28, wherein the electrochemically active material is deposited into the membrane.

31. The process of claim 28, wherein the electrochemically active material comprises a catalyst material on a support material.

32. The process of claim 31, wherein the support material comprises carbon.

33. The process of claim 32, wherein the catalyst material comprises a component selected from platinum, ruthenium, osmium, rhenium, rhodium, iridium, palladium, gold, titanium, tin, tantalum, zirconium, pyrollyzed carbon-supported cobalt macrocyclics and the oxides, alloys and mixtures thereof.

34. The process of claim 28, wherein the oxygen-containing gas comprises a component selected from air, oxygen and oxygen-enriched air.

35. The process of claim 28, wherein the protons and oxygen are reduced at the cathode to form hydrogen peroxide.

36. The process of claim 28, wherein the protons and oxygen are reduced at the cathode to form water.

* * * * *